United States Patent [19]
Garidel

[11] Patent Number: 5,817,217
[45] Date of Patent: Oct. 6, 1998

[54] MACHINE FOR CONFINING A PRIMARY FLUID BY MEANS OF A SECONDARY FLUID IN THE VAPOR PHASE

[76] Inventor: Jean-Paul Garidel, 21, rue Auguste Jamet, 26000 Valence, France

[21] Appl. No.: 652,544

[22] PCT Filed: Nov. 30, 1994

[86] PCT No.: PCT/FR94/01388

§ 371 Date: Jun. 7, 1996

§ 102(e) Date: Jun. 7, 1996

[87] PCT Pub. No.: WO95/15831

PCT Pub. Date: Jun. 15, 1995

[30] Foreign Application Priority Data

Dec. 7, 1993 [FR] France .................................. 93 14948

[51] Int. Cl.⁶ .................................................. B23K 1/12
[52] U.S. Cl. ...................... 202/160; 202/182; 202/185.1; 202/185.2; 202/185.6; 202/205; 202/206
[58] Field of Search .................................... 202/160, 182, 202/185.1, 185.2, 185.6, 205, 206; 228/180.21, 56.3, 219, 234.2, 262.9

[56] References Cited

U.S. PATENT DOCUMENTS 4,348,174  9/1982  Spigarelli ..................................... 432/1
4,681,249  7/1987  Kondo ......................................... 228/37
4,801,069  1/1989  Ankrom et al. ...................... 228/180.2
4,840,305  6/1989  Ankrom et al. ......................... 228/232
5,220,936  6/1993  Pfahl, Jr. et al. ........................ 134/108
5,304,253  4/1994  Grant ........................................ 134/26

FOREIGN PATENT DOCUMENTS 2656973   7/1991  France .
2663496  12/1991  France .
03 27569 12/1991  Japan .

*Primary Examiner*—Nina Bhat
*Attorney, Agent, or Firm*—Bacon & Thomas

[57] ABSTRACT

The invention relates to a machine for confining a primary fluid by means of a secondary fluid whose boiling temperature is lower than that of the primary fluid. The machine includes, in particular, primary vapor cooling means comprising a heat exchanger (11) for exchanging heat between the primary vapor and the secondary fluid (12), which means are provided with orifices (15) for exhausting the secondary vapor into the inside of the tank (4) so that the hat exchanger ensures that the primary vapor condenses and that the secondary fluid vaporizes, thereby making it possible to obtain thermal self-stabilization inside the tank.

12 Claims, 2 Drawing Sheets

MACHINE FOR CONFINING A PRIMARY FLUID BY MEANS OF A SECONDARY FLUID IN THE VAPOR PHASE

TECHNICAL FIELD

The present invention relates to the technical field of using a secondary fluid in the vapor phase to confine a primary fluid that is adapted to perform treatment, in the broad meaning of the term, on various parts or objects.

It is necessary to keep the primary fluid in a limited space whenever the fluid is of a dangerous nature and/or has a high purchase price. By way of non-limiting example, the primary fluid may be perchloroethylene, trichloroethylene, any type of solvent, or a fluorocarbon type liquid.

An application of the invention lies, for example, in the field of cleaning or degreasing parts or objects.

Another particularly advantageous application of the invention lies in the technical field of mounting components in the broad sense, e.g. electronic, electrical, electromechanical, or mechanical type components on a support by means of additional material deposited at points associated with fixing pads of the components. More precisely, the invention can be used in the technique of assembling components by polymerization, in which the additional material is constituted by a polymer, or in the component soldering or reflow technique in which the additional material is constituted by an alloy.

PRIOR ART

In such techniques, it is known in general to use a treatment machine that includes a tank containing a liquid of the fluorocarbon type to be brought to a boiling temperature by heater means so as to produce a saturated and inert primary vapor in an assembly or soldering zone, which vapor is at a temperature that is slightly higher than the melting temperature of the additional material. The assembly or soldering zone is substantially defined between the level of the liquid and a coil used for condensing the primary vapor. The assembly or soldering zone is optionally surmounted by a preheating or cooling zone in which there exists a secondary vapor.

In its top portion, the tank includes a through opening that can be closed by a cover and that is there to allow a support carrying components to be assembled thereto to be inserted into the inside of the tank. Such a support is handled by a device that moves it and holds it successively in the preheating zone, the soldering zone, and the cooling zone. Thus, after the support has been held in the preheating zone for a determined length of time, the support is brought into contact with the primary vapor to cause the latent heat of condensation of the vapor to be transferred to the support and its associated components. This heat input raises the temperature of the support and the components quickly and uniformly to the temperature of the primary vapor, thereby causing the additional material to melt and consequently, depending on the technique used, causing the components to be soldered or polymerized.

By way of example, patent application Ser. No. 90/07,603 describes such a machine whose operation gives satisfaction in practice. Nevertheless, it should be observed that the secondary liquid is used is generally of the CFC type of the kind specified by the Montreal convention, and future use thereof is to be banned. Such a situation leads, more particularly, to two types of machine being used, one that operates with a single vapor phase, and another that operates with two.

A machine operating with a single vapor phase does not include a preheating or cooling zone constituted by a secondary vapor. In addition, the coil for cooling the primary vapor is omitted, with condensation of the primary vapor being provided by a refrigerated belt located at the top portion of the tank. The parts are generally preheated by infrared radiation. That solution presents drawbacks, insofar as cooling takes place in a non-inert ambient atmosphere that could harm the metallurgical quality of the soldering.

The other type of machine which operates with two vapor phases has a secondary vapor surmounting a primary vapor. The ban on CFCs means that a substitute secondary liquid is used, requiring the cooling fluid for condensing the primary vapor to be replaced by thermostatically-controlled oil. Although that technique using two vapor phases ensures good metallurgical quality for soldering while simultaneously complying with standards for protecting the environment, it must be observed that controlling the temperature of the cooling oil turns out to be particularly difficult to achieve.

There is therefore a need to have available a machine which ensures effective confinement of a primary fluid by using a secondary fluid in the vapor phase, but of a kind that is not dangerous, and in which temperature control turns out to be particularly easy to perform well.

SUMMARY OF THE INVENTION

The invention therefore seeks to satisfy this need by proposing a primary fluid confinement machine suitable for complying with standards for environmental protection and designed to make it easy to obtain thermal regulation of the temperature of the primary vapor inside the tank.

To achieve this object, the invention provides a machine for confining a primary fluid by means of a secondary fluid whose boiling temperature is lower than that of the primary fluid, the machine including at least one treatment tank fitted both with heater means suitable for raising the primary fluid to boiling temperature, in such a manner as to produce a primary vapor in a utilization zone which is surmounted by cooling means, and secondly means for producing a secondary vapor from a secondary fluid, the secondary vapor occupying a preheating or cooling zone overlying the utilization zone.

According to the invention, the cooling means for cooling the primary vapor are constituted by a heat exchanger for exchanging heat between the primary vapor and the secondary fluid, the heat exchanger being provided with outlet orifices for expelling secondary vapor into the inside of the tank so that the heat exchanger condenses the primary vapor and vaporizes the secondary fluid, thereby enabling thermal self-stabilization to be obtained inside the tank.

Another object of the invention is to provide a confinement machine that makes it relatively easy to switch from operating with two vapor phases to operating with one, and vice versa.

To this end, the reservoir is provided both with a drain pipe for draining the secondary fluid, which pipe is provided with a controlled valve, and with a return pipe for returning primary fluid to the tank and itself fitted with a controlled valve, the valves of the drain pipe, the overflow pipe, and the tank return pipe being controlled so as to enable operation to switch from a "two-phase" mode of operation using both the primary and the secondary fluids to a "one-phase" mode of operation in which only the primary fluid is used, and back again.

Various other characteristics appear from the following description given with reference to the accompanying drawings, which show embodiments and implementations of the invention as non-limiting examples.

DETAILED DESCRIPTION OF PREFERRED EMBODIMENTS OF THE INVENTION

Figure 1:
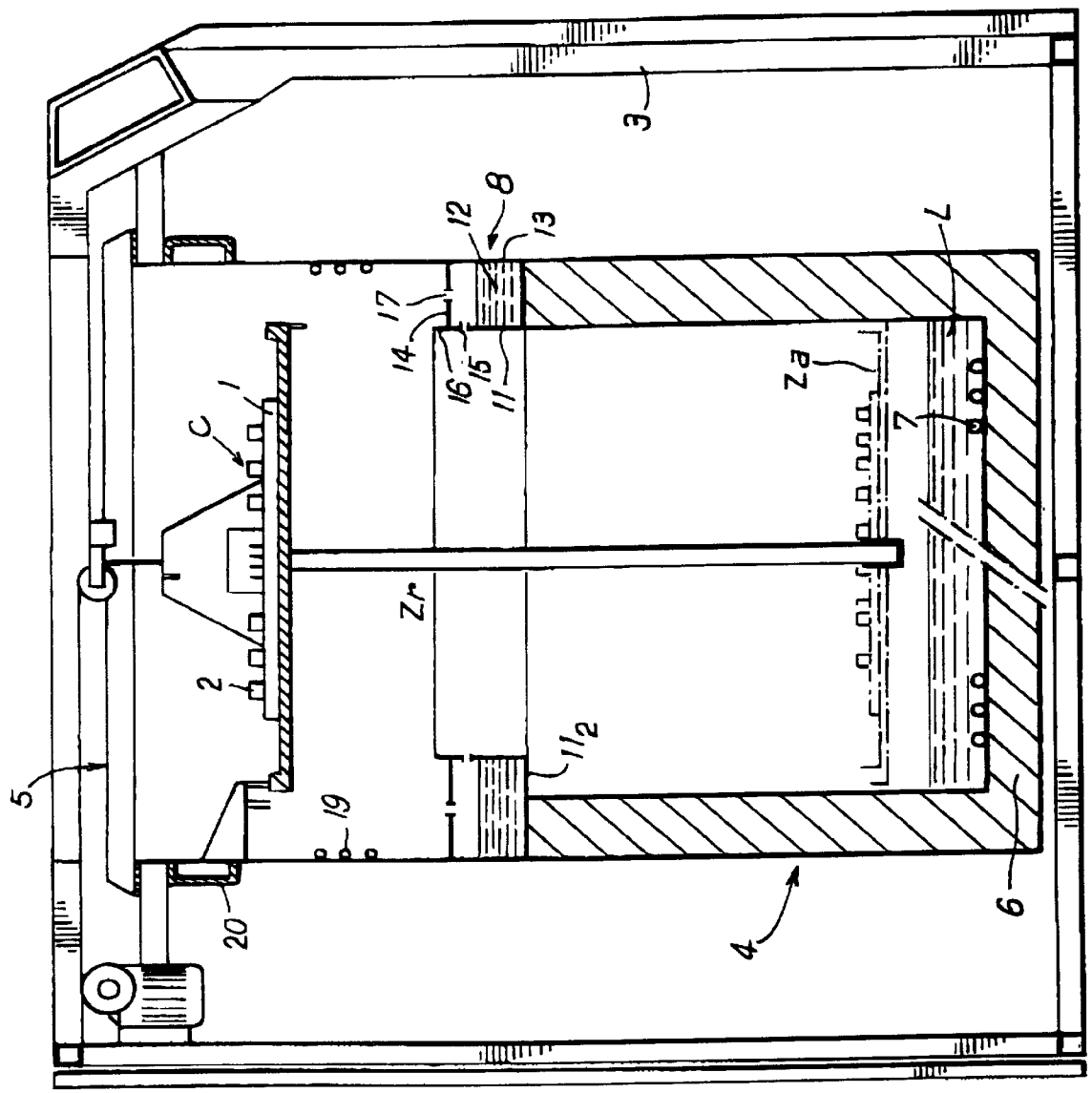
FIG. 1 is a section in elevation showing in its left and right portions two embodiments of a confinement machine of the invention that is adapted to soldering.

FIG. 1 shows an application of the invention to a vapor phase assembly machine for mounting components 2 of any type, singly or in combination, on a support 1 in the broad sense. The components may be electronic, electrical, mechanical or electromechanical, and they are organized in a manner appropriate for taking on specific functions relating to their intended application. In the example described herein, which relates specifically to the vapor phase reflow soldering technique, the support 1 constitutes a printed circuit for receiving components 2 that are fixed thereon by means of an additional material which is constituted by an alloy. The assembly C constituted by the printed circuit 1 with the various components 2 is referred to below as a "card".

The machine has a protective structure 3 containing a treatment tank 4 which is closed at its top portion by a cover 5. The treatment tank 4 is provided externally with a thermal insulation jacket 6. The bottom of the tank is fitted with heater means 7 such as electrical resistance elements. The resistance elements 7 are designed to raise a primary liquid L to boiling temperature, which liquid in the example shown is of the fluorocarbon type, thereby enabling a primary vapor to be produced that is saturated and inert, having a temperature that is slightly higher than the melting point of the alloy previously deposited on the circuit 1 in association with fixing pads for the components 2. The primary vapor is intended to occupy a zone Za for use, assembly, or soldering, which is defined substantially between the level of the liquid L and cooling means 8 of the invention which are described in greater detail below.

The cooling means 8 are constituted by a heat exchanger 11 operating between the primary vapor and a secondary liquid 12 which has a boiling temperature lower than that of the primary liquid. The heat exchanger 11 is constituted, at least in part, by the walls of a vessel, gutter, or reservoir 13 containing the secondary liquid 12.

Figure 2:
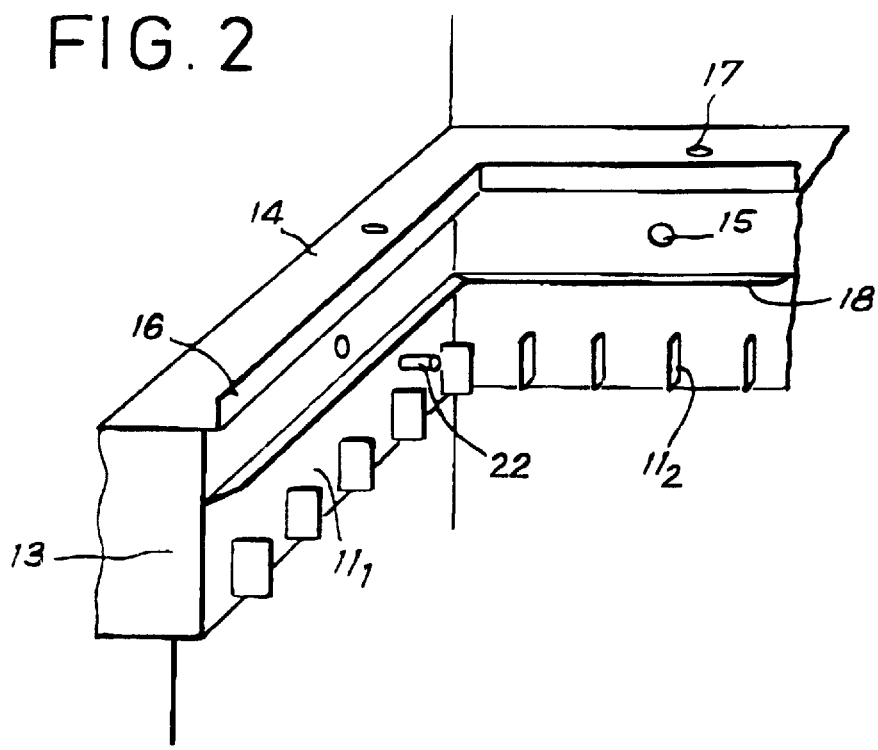
FIG. 2 is a fragmentary perspective view showing characteristic details of the invention.

As can be seen more precisely in FIGS. 1 and 2, the reservoir 13 occupies a given level above the bottom of the tank 4 and extends around the entire periphery thereof. The reservoir 13 includes at least one heat exchange surface $11_1$ constituted by the wall of the reservoir exposed to the inside of the tank. As shown in FIG. 2, the area of the heat exchange surface can be increased by making use of radiating fins $11_2$ carried by the wall $11_1$ of the reservoir and placed on the inside of the tank, optionally together with fins carried by the opposite wall of the reservoir located on the outside of the tank (not shown).

In a first embodiment shown on the right-hand side of FIG. 1, the reservoir 13 has an inside wall $11_1$ lying substantially in the same plane as the inside wall of the tank.

In a second embodiment shown on the left-hand side of FIG. 1, the inside wall $11_1$ of the reservoir projects beyond the plane containing the inside wall of the tank. To this end, a portion $11_3$ of the bottom wall of the reservoir is exposed to the tank interior and projects inwardly from the inside wall of the tank to perform a function that is described below.

The reservoir is fitted with a cover 14 and it communicates with the inside volume of the tank 4 via outlet orifices 15 formed through the inside wall $11_1$. The orifices 15 pass secondary vapor that comes from vaporizing the secondary liquid 12. The secondary vapor is intended to occupy a preheating or cooling zone Zr situated above the assembly zone Za. Advantageously, the outlet orifices 15 have a total through section area that is smaller than the surface area of the secondary liquid contained in the reservoir 13, thereby building up pressure leading to the secondary vapor being ejected and to said vapor extending to the center of the tank. A cushion of secondary vapor is thus created that achieves effective confinement of the primary liquid.

Preferably, the cover 14 is organized to recover condensed secondary vapor. For example, the cover 14 is provided with a rim 16 that co-operates with the inside wall of the tank to define a recovery channel which communicates with the reservoir via through openings 17. In an embodiment shown in FIG. 2, provision may be made for the inside wall $11_1$ to be provided with a gutter 18 that also serves to recover condensed secondary vapor.

The reservoir 13 includes a coil 19 thereabove for condensing the secondary vapor. In conventional manner, the top portion of the tank 4 is fitted with a cooling band 20 located above the coil 19 so as to ensure practically complete condensation of residual vapor and limit consumption of liquid.

The machine described above operates as follow.

When the heater means 7 are put into operation, the primary liquid L begins to vaporize. A portion of the primary vapor condenses on the surfaces of the heat exchanger 11. The walls of the reservoir 13 thus transfer heat to the secondary liquid and its vapor is expelled into the preheating or cooling zone Zr via the outlet orifices 15. It should be observed than an increase in the level of the primary vapor gives rise to an increase in the surface area which is effective for heat exchange, thereby giving rise to a corresponding increase in the emission of secondary vapor. The increase in secondary vapor emission serves to increase the thickness of the secondary vapor cushion, thereby lowering the level of the primary vapor. The effect of this lowering is to reduce the surface area that is effective for heat exchange, thereby decreasing the emission of secondary vapor. The decrease in the thickness of the cushion of secondary vapor leads to an increase in the level of the primary vapor, and thus to an increase in the heat exchange area. The above-described process continues until it has stabilized thermally. As a result, the machine of the invention makes it possible to achieve self-regulation or self-stabilization of temperature inside the tank, while simultaneously ensuring effective confinement of the primary vapor inside the tank by means of the cushion of secondary vapor.

It should be understood that the heat exchange area of the heat exchanger adjusts automatically to the amount of excess heat to be removed as produced by the heater means 7. The heat exchanger area thus varies between zero at the bottom of the reservoir 13 and a maximum value corresponding to the level occupied by the secondary liquid 12 inside the reservoir. It should be observed that in the embodiment shown on the left-hand side of FIG. 1, the heat exchange area varies between a maximum value corresponding to the maximum height occupied by the secondary liquid inside the reservoir 13 and a constant minimum value defined by the bottom wall $11_3$ of the reservoir which projects from the inside wall of the tank. In general, it should be considered that the heat exchanger 11 must have a heat exchange area of dimensions adapted to absorb the heat conveyed by the primary vapor as obtained when the heater means are operating at maximum power. In this respect, in the event of a failure, provision is made for a temperature probe 22 (FIG. 2) mounted on the reservoir 13 and connected to means adapted to stop operation of the heater elements 7 whenever the temperature of the probe reaches a value that corresponds substantially to the boiling point of the primary vapor.

The level of the primary vapor depends on the power delivered by the heater means 7 and on the heat exchange area on the heat exchanger 11. Additionally, provision may be made for the reservoir 13 to be fitted with means for cooling the secondary liquid 12. By way of example, these cooling means may be constituted by a coil 12a placed in the reservoir or by a cooling jacket (not shown) surrounding the reservoir.

The machine of the invention also offers the advantage of being capable of switching easily from operating with two vapor phases to operating with one phase only. As can be seen more clearly from FIG. 3, the reservoir 13 is provided with a secondary liquid feed pipe 24 itself fitted with a controlled valve 25 and connected to a pump 26 in turn connected to a return or secondary fluid source 27 for the secondary liquid 12. The outlet pipe from the return or source 27, situated upstream from the pump 26, is fitted with a controlled valve 28.

The reservoir 13 is also provided with an overflow pipe 30 that sets the maximum level of secondary liquid 12 inside the reservoir 13. The overflow pipe 30 leads to the return or source 27 and it is provided with a controlled valve 31. The reservoir 13 includes a drain pipe 32 that leads to return or source 27 and that is provided with a controlled valve 33. The reservoir 13 is also provided with a pipe 34 fitted with a controlled valve 35 and serving to provide communication between the reservoir 13 and the inside of the tank 4.

When operating with two phases, the valves 33 and 35 are closed while the valves 25, 28, and 31 are open, with the pump 26 being switched on so as to feed secondary liquid to the inside of the reservoir 13.

When switching from operation with two vapor phases to operation with one phase only, the heater elements 7 are switched off as is the pump 26. The valve 33 in the drain pipe is opened until all of the secondary liquid 12 contained in the reservoir has been removed therefrom. The valves 25, 31, and 33 are closed and the valve 35 of the pipe 34 for return to the tank is opened. During operation using a single vapor phase, the reservoir 13 recovers primary vapor condensate which is returned to the inside of the tank 4 via the pipe 34.

In order to switch from operation with a single vapor phase to operation with two vapor phases, the heater means are switched off and the valve 35 is closed. The valves 31, 28 and 25 are opened and the pump 26 is switched on to fill the reservoir 13 with the secondary liquid. The heater means 7 are then switched back on.

As can be seen from the above, the machine of the invention makes it easy to switch from operation using a single vapor phase to operation using two vapor phases, and vice versa. The machine also has the advantage of enabling the primary liquid to be purified. To do this, the drain pipe 32 must be provided with a branch connection having a controlled primary fluid regenerator valve 36 leading to a secondary fluid regenerator vessel 37 that is reserved for the primary liquid L. The outlet from the vessel 37 is connected to the pump 26 and is fitted with a controlled valve 38. After the secondary liquid has been emptied from the reservoir 13, primary liquid regeneration consists in closing the valves 25, 31, 35, and 28, and opening the valves 33, 36, and 38. The heater elements 7 are switched on until the temperature measured at the top level of the tank 4 reaches the boiling temperature of the primary liquid. After the heater means 7 have been switched off, the tank 4 can be cleaned. Thereafter, the valves 33, 31, 36, and 28 are closed while the valves 25, 35, and 38 are opened. The pump 26 is switched on so as to transfer the purified primary liquid contained in the vessel 37 into the tank 4 via the reservoir 13 and the return pipe 34.

Figure 3:
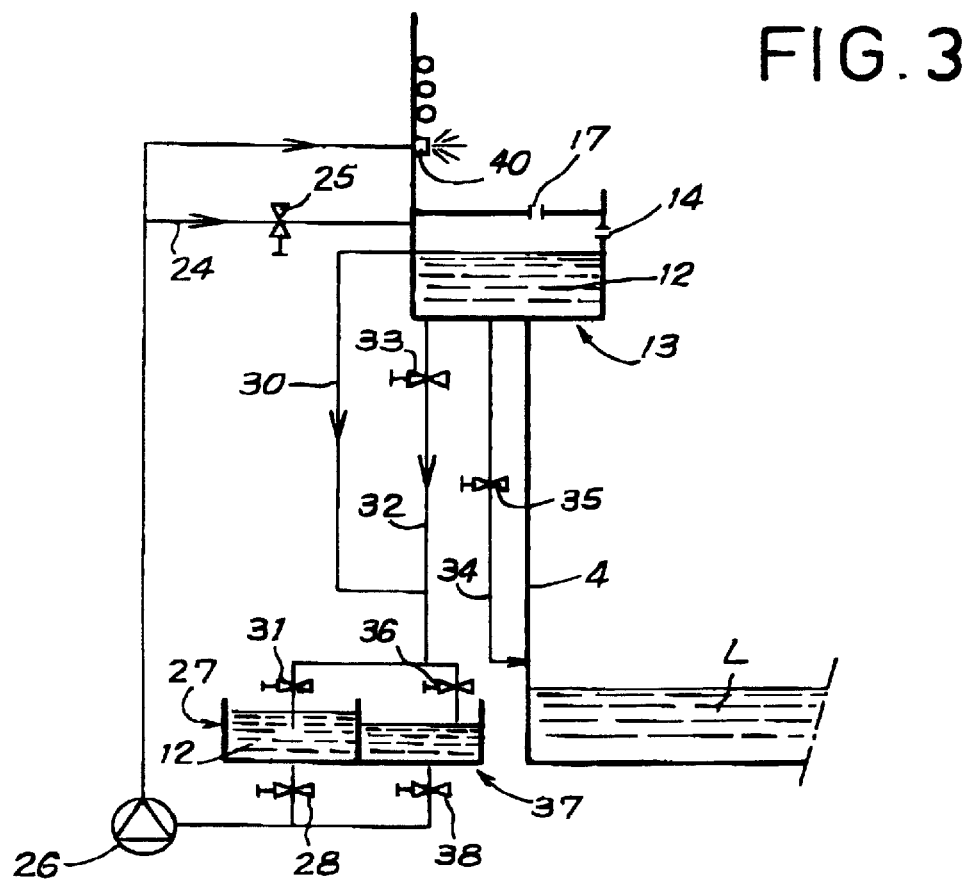
FIG. 3 is a simplified hydraulic circuit diagram for explaining a characteristic of the invention.

According to a characteristic of the invention, provision may have made for the reservoir 13 to be at least one liquid injector 40 above the reservoir. As can be seen in FIG. 3, the injector point 40 is connected to the outlet of the pump 26. The function of the injector 40 is to inject fine droplets of a cold liquid at a card that is in the process of cooling. The card is thus dried by lowering the boiling point of the liquid condensed thereon, thereby making it possible to accelerate cooling. Evaporation of the liquid uses up a large amount of the heat contained in the card. It should be observed that the quantity of liquid injected also makes it possible to control the rate of cooling.

Cooling by injecting liquid and evaporating it serves to reduce cooling time, and consequently to improve the metallurgical quality of the soldering. During operation with two vapor phases, this cooling technique is implemented more particularly by feeding the injector 40 with the secondary liquid. For cooling operation, the valves 25, 35, 36, and 38 are closed while the valves 31 and 28 are open. The valve 33 is opened intermittently so as to maintain the secondary liquid in the reservoir 13 at a given level.

SUITABILITY FOR INDUSTRIAL APPLICATION

In the above description, the invention relates to a machine that is adapted more particularly to soldering parts by means of a primary liquid L which is confined by a secondary vapor. It should be understood that the invention relates in more general manner to any machine having one or more tanks enabling a vaporized or unvaporized primary fluid to be confined by means of a secondary fluid in the vapor phase, with the nature of the primary fluid being appropriate for performing treatment on parts or objects of various kinds. By way of example, the primary fluid may be adapted to clean or degrease and it may be constituted by any type of solvent, including fluorocarbon liquids. Naturally, the boiling point of the secondary fluid must be lower than that of the primary fluid, and the temperature difference must be sufficient to enable the phases to be separated. Also, the secondary fluid is of an inert character, being non-flammable, non-explosive, and non-toxic.

The invention is not limited to the examples described and shown and numerous modifications can be applied thereto without going beyond the ambit of the invention.

I claim:

1. A machine for confining a primary fluid by a secondary fluid, comprising:

a treatment tank (4) including a lower area and at least one generally vertical wall extending upwardly from said lower area for containing a primary fluid in liquid and vaporized forms;

a liquid primary fluid (L) in the tank lower area;

a heater (7) in the tank or area for heating liquid primary fluid in the tank to its boiling temperature to produce a primary vapor of vaporized primary fluid in the tank above the liquid primary fluid;

a utilization zone (Za) above the liquid primary fluid in the tank for receiving primary vapor upon vaporization of the primary fluid;

a cooling system (8) above the utilization zone within the tank, the cooling system including a reservoir container (13) defined by at least generally vertically and generally horizontally extending walls ($11_1$, $11_3$) exposed to the tank interior and a liquid secondary fluid (12) contained in the reservoir, said liquid secondary fluid having a lower boiling temperature than said liquid primary fluid;

a preheating/cooling zone ($Z_r$) in the tank located above the utilization zone and adjacent the reservoir;

said reservoir including heat exchanger structure for exchanging heat between heated primary vapor in the tank and secondary fluid in the reservoir by transfer of heat from the primary vapor to the liquid secondary fluid in the reservoir, and outlet orifices (15) for discharging secondary fluid vapor vaporized by such heat exchange into the preheating/cooling zone;

whereby primary vapor in the preheating/cooling zone heats and vaporizes liquid secondary fluid in the reservoir via the heat exchanger to cause discharge of secondary fluid vapor into the preheating/cooling zone to cool and condense the primary vapor in a continuous manner to thereby effect self-stabilization and containment of the primary vapor in the tank below the preheating/cooling zone.

2. A machine according to claim 1, wherein said reservoir generally horizontal wall ($11_3$) projects inwardly from the tank vertical inner wall towards the tank interior at the preheating/cooling zone.

3. A machine according to claim 1, including a source of secondary fluid and a secondary fluid supply conduit (24) in communication with the reservoir, and an overflow conduit (30) having an input connected to the reservoir so that the level of secondary fluid in the reservoir may be maintained at a constant level at the overflow conduit inlet upon flow of secondary fluid from the source to the reservoir; a secondary fluid flow inducing device (26) for causing such flow; and a selectively controllable overflow valve (31) in the overflow conduit arranged to control return flow through the overflow conduit;

whereby an operating level of secondary fluid in the reservoir may be established and maintained to provide a heat exchanger area in the heat exchanger determined by said operating level.

4. A machine according to claim 1, wherein said heat exchanger includes a heat exchanger area that is effective to condense primary vapor in the preheating/cooling zone when the heater is fully operational.

5. A machine according to claim 1, wherein the reservoir includes a cover (14) arranged so as to collect condensed secondary fluid.

6. A machine according to claim 5, wherein said reservoir includes a gutter (18) arranged so as to collect condensed secondary fluid, said gutter extending generally towards the tank interior.

7. A machine according to claim 1, including a secondary fluid cooler in the reservoir arranged to cool the secondary fluid.

8. A machine according to claim 1, including a temperature probe in the reservoir and a central device for controlling operation of the liquid primary fluid heater, said control device arranged so as to be responsive at least to a preset high temperature sensed by the temperature probe.

9. A machine according to claim 3, including a drain pipe (32) in communication with said reservoir; a selectively operable drain valve (33) in said drain pipe for controlling flow in the drain pipe; a return pipe (34) having an inlet in communication with said reservoir and an outlet in communication with the lower end of said tank; a selectively operable return valve in said return pipe for controlling flow in the return pipe; said overflow pipe, overflow valve, drain pipe, drain value, return pipe and return valve being arranged such that upon selective opening and closing of said valves, the reservoir may be selectively drained of liquid secondary fluid and liquid primary fluid in the reservoir may be returned to the lower area of the tank, whereby the machine may function selectively as a "two-phase" or "one-phase" machine.

10. A machine according to claim 1, including a liquid secondary fluid injector located above the reservoir.

11. A machine according to claim 9, including a primary fluid regeneration vessel (37), said drain pipe providing communication between said reservoir and said vessel; and a selectively operable primary fluid regenerator valve (36) in said drain pipe, whereby vaporized primary fluid condensed in the reservoir may be regenerated.

12. A machine according to claim 1, wherein the total flow area of said outlet orifices is less than the surfaced area of the liquid secondary fluid, whereby, upon vaporization of secondary fluid at its surface, the secondary fluid vapor is pressurized in the reservoir to cause ejection of the secondary fluid vapor through the orifices.

* * * * *